(12) United States Patent
Afrooze (10) Patent No.: US 10,334,145 B2
(45) Date of Patent: Jun. 25, 2019

(54) CAMERA SUPPORTING REMOVABLE STORAGE DIVIDED INTO A JOURNALED PARTITION AND A NON-JOURNALED PARTITION

(71) Applicant: Avigilon Corporation, Vancouver (CA)

(72) Inventor: Sina Afrooze, Vancouver (CA)

(73) Assignee: Avigilon Corporation, Vancouver (CA)

(*) Notice: Subject to any disclaimer, the term of this patent is extended or adjusted under 35 U.S.C. 154(b) by 0 days.

(21) Appl. No.: 15/925,449

(22) Filed: Mar. 19, 2018

(65) Prior Publication Data

US 2018/0213128 A1 Jul. 26, 2018

Related U.S. Application Data

(63) Continuation of application No. 14/093,367, filed on Nov. 29, 2013, now abandoned.

(51) Int. Cl.
*G06F 3/06* (2006.01)
*H04N 5/225* (2006.01)
(Continued)

(52) U.S. Cl.
CPC ......... *H04N 5/2252* (2013.01); *G06F 1/1605* (2013.01); *G06F 3/0614* (2013.01);
(Continued)

(58) Field of Classification Search
CPC ...... H04N 5/2252; H04N 5/907; H04N 5/772; G06F 17/30227; G06F 3/0638;
(Continued)

(56) References Cited

U.S. PATENT DOCUMENTS 5,572,310 A 11/1996 Hoberock et al.
6,609,187 B1 * 8/2003 Merrell ................. G06F 3/0601
707/999.202

(Continued)

OTHER PUBLICATIONS

Frost et al., "Generalized File System Dependencies", SOSP '07, Oct. 14-17, 2007, ACM. Retrieved on Feb. 28, 2019 from <http://featherstitch.cs.ucla.edu/publications/featherstitch-sosp07.pdf>. (Year: 2007).*

(Continued)

*Primary Examiner* — Arpan P. Savla
(74) *Attorney, Agent, or Firm* — Daniel Hammond (57) ABSTRACT

A camera that supports removable storage divided into multiple partitions is configured to write files to removable storage that is formatted into journaled and non-journaled partitions. The journaled partition uses a journaling file system and the non-journaled partition uses a non-journaling file system that is supported natively by an operating system, such as the operating system of a desktop computer. The non-journaled partition has stored on it computer program code executable by a processor to use the operating system to access files stored on the journaled partition. The camera may also be configured to partition the removable storage into the journaled and non-journaled partitions. The camera writes data to the journaled partition. This permits the processor to access the files stored on the journaled partition by the camera even if the operating system does not natively support the journaled partition.

12 Claims, 6 Drawing Sheets

(51) Int. Cl.
*G06F 1/16* (2006.01)
*G06F 16/18* (2019.01)
*H04N 5/77* (2006.01)
*H04N 5/907* (2006.01)

(52) U.S. Cl.
CPC .......... *G06F 3/0617* (2013.01); *G06F 3/0638* (2013.01); *G06F 3/0644* (2013.01); *G06F 3/0683* (2013.01); *G06F 16/1805* (2019.01); *G06F 16/1815* (2019.01); *G06F 16/1865* (2019.01); *H04N 5/772* (2013.01); *H04N 5/907* (2013.01); *G06F 2212/2146* (2013.01)

(58) Field of Classification Search
CPC ............. G06F 3/0683; G06F 17/30191; G06F 3/0614; G06F 3/0644; G06F 17/30185; G06F 1/1605; G06F 3/0617; G06F 2212/2146
See application file for complete search history.

(56) References Cited

U.S. PATENT DOCUMENTS

| | | | |
|---|---|---|---|
| 6,654,051 B1* | 11/2003 | Fujita | H04N 1/2112 348/207.1 |
| 6,718,319 B1* | 4/2004 | Fisher, Jr. | G06Q 20/3552 |
| 7,683,942 B2 | 3/2010 | Tsujii et al. | |
| 7,932,933 B2 | 4/2011 | Tsujii et al. | |
| 2002/0147900 A1 | 10/2002 | Tashiro et al. | |
| 2003/0167376 A1* | 9/2003 | Koh | G06K 19/077 711/115 |
| 2004/0186858 A1 | 9/2004 | McGovern et al. | |
| 2006/0085493 A1* | 4/2006 | Kim | G06F 3/0608 |
| 2008/0098040 A1 | 4/2008 | Xie | |
| 2008/0103658 A1* | 5/2008 | Boac | G06F 8/65 701/36 |
| 2008/0147964 A1 | 6/2008 | Chow et al. | |
| 2009/0265302 A1 | 10/2009 | Sudhakar | |
| 2010/0131699 A1 | 5/2010 | Luukkainen | |
| 2010/0257218 A1 | 10/2010 | Vassilev et al. | |
| 2012/0072401 A1 | 3/2012 | Johri et al. | |
| 2012/0173595 A1* | 7/2012 | Salters | G06F 16/1865 707/822 |
| 2012/0179730 A1* | 7/2012 | Slegers | G06F 16/1865 707/822 |
| 2012/0194691 A1 | 8/2012 | Yasutomi | |
| 2012/0194702 A1 | 8/2012 | Naka | |
| 2012/0221609 A1 | 8/2012 | Boor et al. | |

OTHER PUBLICATIONS

"Anatomy of Linux journaling file systems", downloaded from the Internet on Nov. 6, 2013; 6 pp; www.ibm.com/developerworks/library/I-journaling-filesystems/index.html.
"Disk partitioning", downloaded from the Internet on Nov. 6, 2013; 7 pp; en.wikipedia.org/wiki/Disk_partitioning.
International Search Report and Written Opinion dated Jul. 29, 2014, issued by the Canadian Intellectual Property Office in corresponding PCT Application Serial No. PCT/CA2013/050920, filed Nov. 29, 2013.
Supplemental European Search Report dated Jun. 29, 2017, issued by the European Patent Office in European Application No. EP 13 89 8152.
Yatri Trivedi, "How to Browse Your Linux Partition from Windows", http://www.howtogeek.com/howto/33387/how-to-browse-your-linux-partition-from-windows, published on Oct. 29, 2010.
T081193, "Re: What is the Benefits of Partitioning the SD card?", http://androidqueries.com/what-benefits-partioning-sd-card-622.html#post22453, published on Jul. 18, 2012.

* cited by examiner

CAMERA SUPPORTING REMOVABLE STORAGE DIVIDED INTO A JOURNALED PARTITION AND A NON-JOURNALED PARTITION

CROSS-REFERENCE TO RELATED APPLICATION

This application is a continuation of U.S. patent application Ser. No. 14/093,367, entitled "Camera Supporting Removable Storage Divided into Multiple Partitions" and filed Nov. 29, 2013, the entirety of which is hereby incorporated by reference herein.

TECHNICAL FIELD

The present disclosure is directed generally at a camera that supports removable storage divided into multiple partitions.

BACKGROUND

Cameras that are able to write files to removable storage are becoming increasingly prevalent. An example type of camera is a security camera, and example types of files that can be written to removable storage are audio files, video files (including those video files that comprise an audio track), and still images. Security cameras that offer removable storage are gaining in popularity because they offer the convenience of permitting video files to be stored even when the cameras are disconnected from a network or when the network fails. Research and development accordingly continue into methods, systems, and techniques related to improving the ability of cameras to use removable storage.

SUMMARY

According to a first aspect, there is provided a camera comprising a camera body comprising an aperture to permit light to enter the camera body; an image sensor located within the camera body and positioned to receive at least some of the light entering the camera body; removable media circuitry configured to write to removable storage that is formatted to comprise: (i) a journaled partition that uses a journaling file system; and (ii) a non-journaled partition that uses a non-journaling file system supported natively by an operating system, wherein the non-journaled partition has stored thereon computer program code executable by a processor to use the operating system to access files stored on the journaled partition; and processing circuitry, communicatively coupled to the image sensor and the removable media circuitry, configured to store files to the journaled partition using the journaling file system.

The usable capacity of the removable storage may be allocated entirely to the journaled and non-journaled partitions. The processing circuitry optionally does not write or erase data from the non-journaled partition. The journaled partition may have a larger capacity than the non-journaled partition. The camera may be a security camera.

According to another aspect, there is provided a camera, comprising a camera body comprising an aperture to permit light to enter the camera body; an image sensor located within the camera body and positioned to receive at least some of the light entering the camera body; removable media circuitry, wherein the removable media circuitry is configured to write to removable storage; and processing circuitry, communicatively coupled to the image sensor and the removable media circuitry, configured to perform a method comprising: (i) partitioning the removable storage to comprise a journaled partition that uses a journaling file system and a non-journaled partition that uses a non-journaling file system supported natively by an operating system; and (ii) storing on the non-journaled partition computer program code executable by a processor to use the operating system to access files stored on the journaled partition.

The usable capacity of the removable storage may be allocated entirely to the journaled and non-journaled partitions. The processing circuitry optionally does not write data to or erase data from the non-journaled partition following storing the computer program code on it. The processing circuitry may be further configured, following partitioning the removable storage, to store one or more of video files derived from the light incident on the image sensor, audio files, and still images. The journaled partition may have a larger capacity than the non-journaled partition.

The method that the processing circuitry performs may further comprise, prior to partitioning the removable storage, any one or more of the following:
  (a) determining whether the removable storage comprises only a first initial partition that uses the non-journaling file system and whether the first initial partition is empty; and when the removable storage comprises only the first initial partition and the first initial partition is empty, erasing the first initial partition;
  (b) determining whether the removable storage comprises only a first initial partition that uses the non-journaling file system and a second initial partition that uses the journaling file system; and when the removable storage does not comprise only the first and second initial partitions, prompting a user to confirm the partitioning is to proceed and commencing the partitioning after receiving user confirmation;
  (c) when the removable storage comprises only the first and second initial partitions, determining the size of the first initial partition; and when the size of the first initial partition does not equal a fixed non-journaled partition size, prompting the user to confirm the partitioning is to proceed and commencing the partitioning after receiving user confirmation;
  (d) when the size of the first initial partition equals the non-journaled partition size, determining whether the computer program code is present on the first initial partition; and when the computer program code is absent from the first initial partition, prompting the user to confirm the partitioning is to proceed and commencing the partitioning after receiving user confirmation; and
  (e) when the computer program code is present on the first initial partition, determining whether all usable capacity of the removable storage is allocated entirely to the first and second initial partitions; and when the capacity of the removable storage is not allocated entirely to the first and second initial partitions, prompting the user to confirm the partitioning is to proceed and commencing the partitioning after receiving user confirmation.

The camera may be a security camera.

According to another aspect, there is provided a method for partitioning removable storage for a camera, the method comprising determining whether the removable storage is connected to the camera; when the removable storage is connected to the camera, using the camera to: (i) partition the removable storage to comprise a journaled partition that uses a journaling file system and a non-journaled partition that uses a non-journaling file system supported natively by an operating system; and (ii) store on the non-journaled partition computer program code executable by a processor to use the operating system to access files stored on the journaled partition.

The usable capacity of the removable storage may be allocated entirely to the journaled and non-journaled partitions. Following partitioning the removable storage, the camera may store one or more of video files derived from the light incident on the image sensor, audio files, and still images. The journaled partition may have a larger capacity than the non-journaled partition.

The method may further comprise, prior to partitioning the removable storage, any one or more of the following:
(a) using the camera to determine whether the removable storage comprises only a first initial partition that uses the non-journaling file system and whether the first initial partition is empty; and when the removable storage comprises only the first initial partition and the first initial partition is empty, erase the initial partition;
(b) using the camera to determine whether the removable storage comprises only a first initial partition that uses the non-journaling file system and a second initial partition that uses the journaling file system; and when the removable storage does not comprise only the first and second initial partitions, prompting a user to confirm the partitioning is to proceed and commencing the partitioning after receiving user confirmation;
(c) using the camera to, when the removable storage comprises only the first and second initial partitions, determine the size of the first initial partition; and when the size of the first initial partition does not equal a fixed non-journaled partition size, prompt the user to confirm the partitioning is to proceed and commencing the partitioning after receiving user confirmation;
(d) using the camera to, when the size of the first initial partition equals the non-journaled partition size, determine whether the computer program code is present on the first initial partition; and when the computer program code is absent from the first initial partition, prompt the user to confirm the partitioning is to proceed and commencing the partitioning after receiving user confirmation; and
(e) when the computer program code is present on the first initial partition, determining whether all usable capacity of the removable storage is allocated entirely to the first and second initial partitions; and when the capacity of the removable storage is not allocated entirely to the first and second initial partitions, prompting the user to confirm the partitioning is to proceed and commencing the partitioning after receiving user confirmation.

According to another aspect, there is provided a non-transitory computer readable medium having encoded thereon statements and instructions to cause a camera to partition removable storage for the camera by performing a method comprising determining whether the removable storage is connected to the camera; and when the removable storage is connected to the camera, using the camera to perform any aspects of the methods recited above and any suitable variations and combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description is intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

Removable storage for a camera can comprise various types of removable, non-transitory computer readable media. For example, removable storage may take the form of memory cards, external hard drives, or solid state drives (SSDs) designed to interface with ports accessible from outside the camera's housing and that can be connected to and disconnected from the camera as the user desires. Removable storage may be directly connected to the camera, such as when a memory card is inserted into a memory card reader that comprises part of the camera or when an external SSD drive is connected to the camera's USB port, or alternatively may be indirectly connected to the camera via a wide or local area network, such as an Ethernet based network, the Internet, or another Internet protocol (IP) network.

Regardless of what type of removable storage is used, the camera writes data to, and optionally reads data from, the storage in accordance with a file system. Many different types of file systems are known in the art. For example, a common file system used with one type of removable storage, a memory card (an example of which is labeled 128 in FIG. 2), is "FAT32". One common type of memory card is a Secure Digital (SD) memory card (SD card). One reason FAT32 is commonly used is that both the Windows™ and OS X™ operating systems natively support it. This permits the user to access video files stored on a FAT32 formatted memory card by simply taking the memory card from the camera and inserting it into a card reader connected to a desktop computer running the Windows™ or OS X™ operating systems. However, FAT32 is not particularly resilient to power loss or to removable storage being disconnected from the camera without advance notice ("sudden disconnection"). A power loss or sudden disconnection can result in the files stored using FAT32 becoming corrupt.

Other file systems, known as journaling filing systems, are inherently more resilient to power loss and sudden disconnection than FAT32, which is an example of a non-journaling file system. In a journaling file system, a file called a "journal" is maintained that keeps track of changes made to files stored using the file system. In the event of a power loss or sudden disconnection, the journal is accessed and is used to restore or confirm the integrity of the remainder of the file system. An example of a journaling file system is "ext4". However, most journaling file systems, including ext4, are not natively supported by the Windows™ and OS X™ operating systems.

Accordingly, if ext4 or any one of several other journaling file systems is to be used for removable storage, there is a technical challenge to be overcome in order to maintain compatibility with computers running the Windows™ and OS X™ operating systems. One way to address this challenge is to require users to install third party software on their computers that provide non-native support for the journaling file system being used. However, requiring users to do this is not user friendly or convenient. Another solution is to require users to access the removable storage via an IP network through either a web interface that comprises part of the camera's firmware or through proprietary software installed on one or both of the camera and the users' computers. However, using this solution requires the camera to be an IP camera that is connected to an IP network. The files stored using the removable storage are inaccessible if the network is down or if the camera becomes disconnected from the network. Additionally, accessing files via a web interface can be up to an order of magnitude slower than accessing files by directly connecting the removable storage to a computer.

The embodiments described herein are directed at a camera that supports removable storage that has at least two partitions. In one embodiment, the removable storage has journaled and non-journaled partitions, with the journaled partition using a journaling file system and the non-journaled partition using a non-journaling file system supported natively by an operating system such as the Windows™ and OS X™ operating systems. The journaled partition is typically much larger than the non-journaled partition and is used as the main storage area on the removable storage. Computer program code is stored on the non-journaled partition, and this program code is executable by a processor, such as a processor used in a desktop computer, to use the operating system to access files stored on the journaled partition. Various embodiments herein also describe methods and techniques describing how and when to format the removable storage to support the journaling and non-journaling file systems. By including on the non-journaled partition the computer program code that permits the operating system to access files on the journaled partition, users obtain the benefits of the journaling file system without having to separately install third party software on their computers and without having to access the camera only through an IP network. The security camera is accordingly able to use removable storage in a manner that is resilient against power loss and the removable storage's sudden disconnection. While the depicted embodiments are of a security camera, in alternative embodiments (not depicted) the camera may be another type of camera, such as a traffic camera or hand-held camera. The data the camera stores on the removable storage may be any type of data such as audio files, video files (including those video files that comprise an audio track), and still images.

Figure 1A:
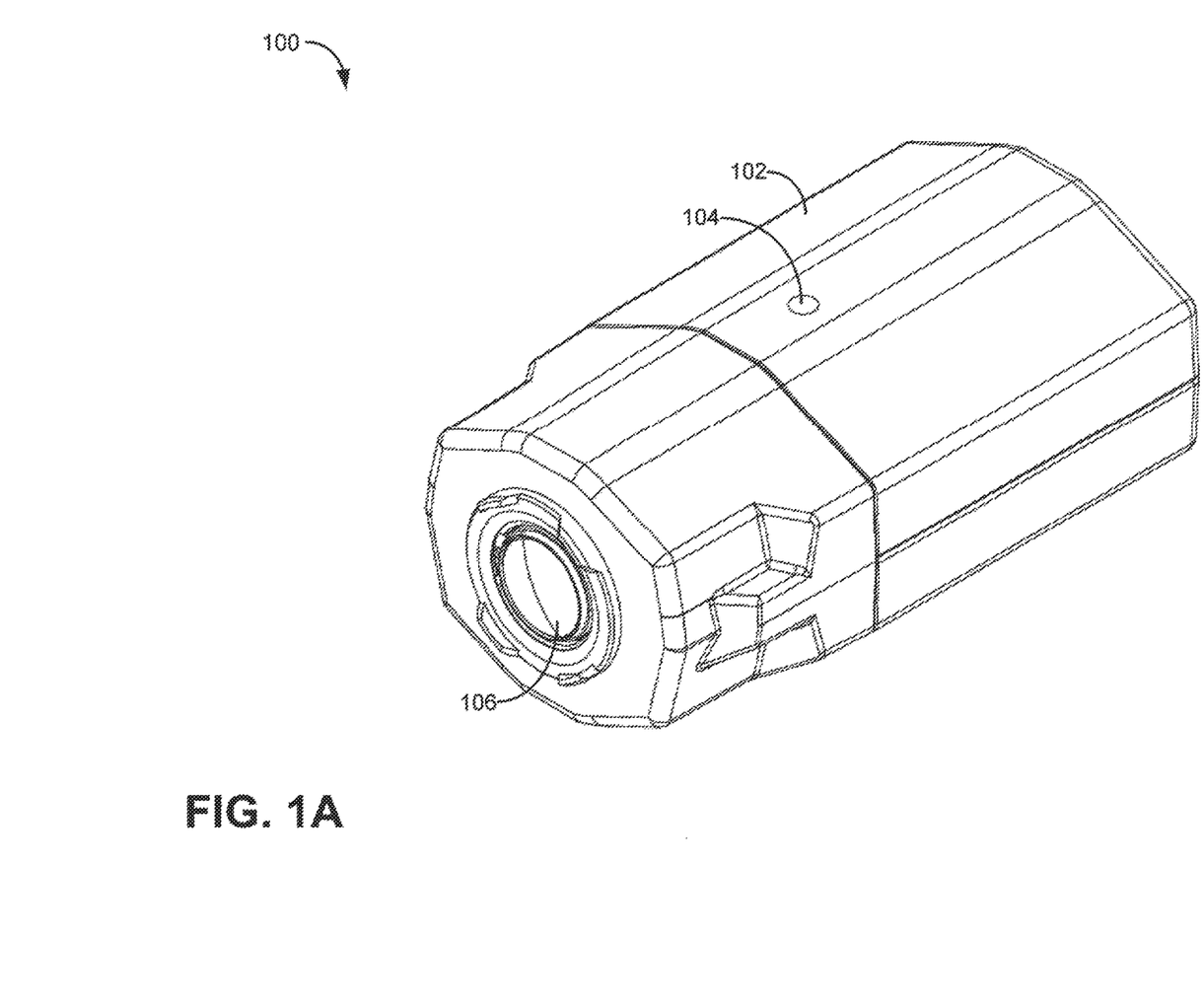
FIGS. 1A and 1B are front and rear perspective views, respectively, of a security camera that supports removable storage divided into multiple partitions, according to one embodiment.
Figure 1B:
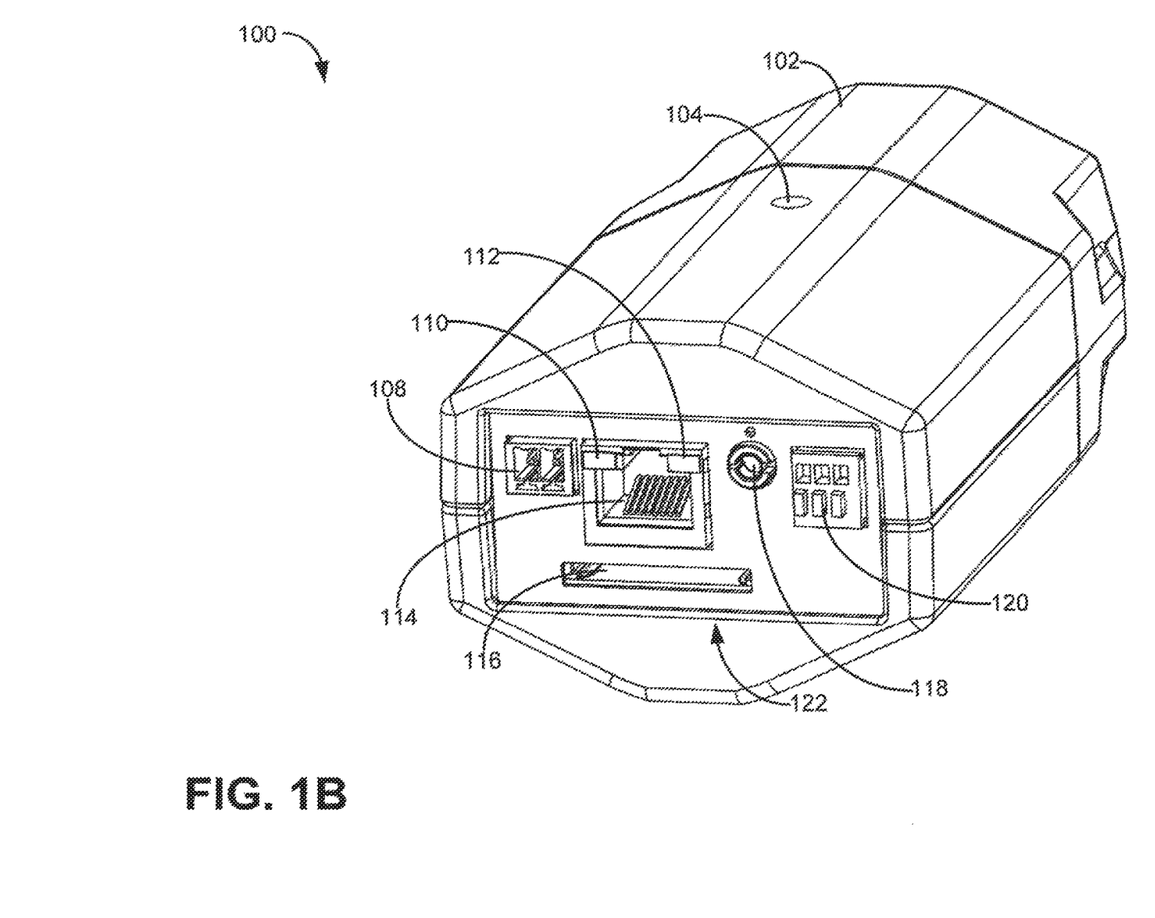

Referring now to FIGS. 1A and 1B, there are shown front and rear perspective views, respectively, of a security camera 100 that supports removable storage divided into multiple partitions, according to one embodiment. The camera 100 is contained within a camera body 102. On the top and bottom of the body 102 are camera mounts 104, of which only the top one is visible in FIGS. 1A and 1B. At the front of the body is an aperture 106 through which light may enter the camera body 102, be incident on an image sensor (not shown in FIG. 1A or 1B, but labeled 126 in FIG. 2), and consequently be processed to generate video images.

On the rear of the camera body 102 is a control plate 122 with various inputs and outputs relevant to camera operation. On the leftmost of the control plate 122 is a power control block 108 for receiving a power plug; alternatively, in some embodiments Power over Ethernet (PoE) technology may be used to power the camera 100 in which case the power control block 108 may remain unused during camera operation. Adjacent to the power control block 108 is a network jack in the form of an RJ45 (Ethernet) jack 114. The RJ45 jack 114 receives an RJ45 plug (not shown) that connects the camera to an IP network. At the opposing corners of the top side of the RJ45 jack 114 are a connection status LED 110 and a link LED 112 that respectively provide information on the camera's 100 status and on whether the camera 100 is connected to an active Ethernet connection. Below the RJ45 jack 114 is removable media circuitry in the form of a memory card reader and any associated host controller and similar circuitry (hereinafter, collectively "memory card reader 116) that accepts removable storage in the form of a memory card (not shown in FIG. 1, but labeled as 128 in FIG. 2). Between the RJ45 jack 114 and the right edge of the control plate 122 are an audio/video connector 118 that accepts a 3.5 mm plug for connecting to a microphone or monitor, and general purpose input/output ports 120 for connecting the camera 100 to various external devices.

Figure 2:
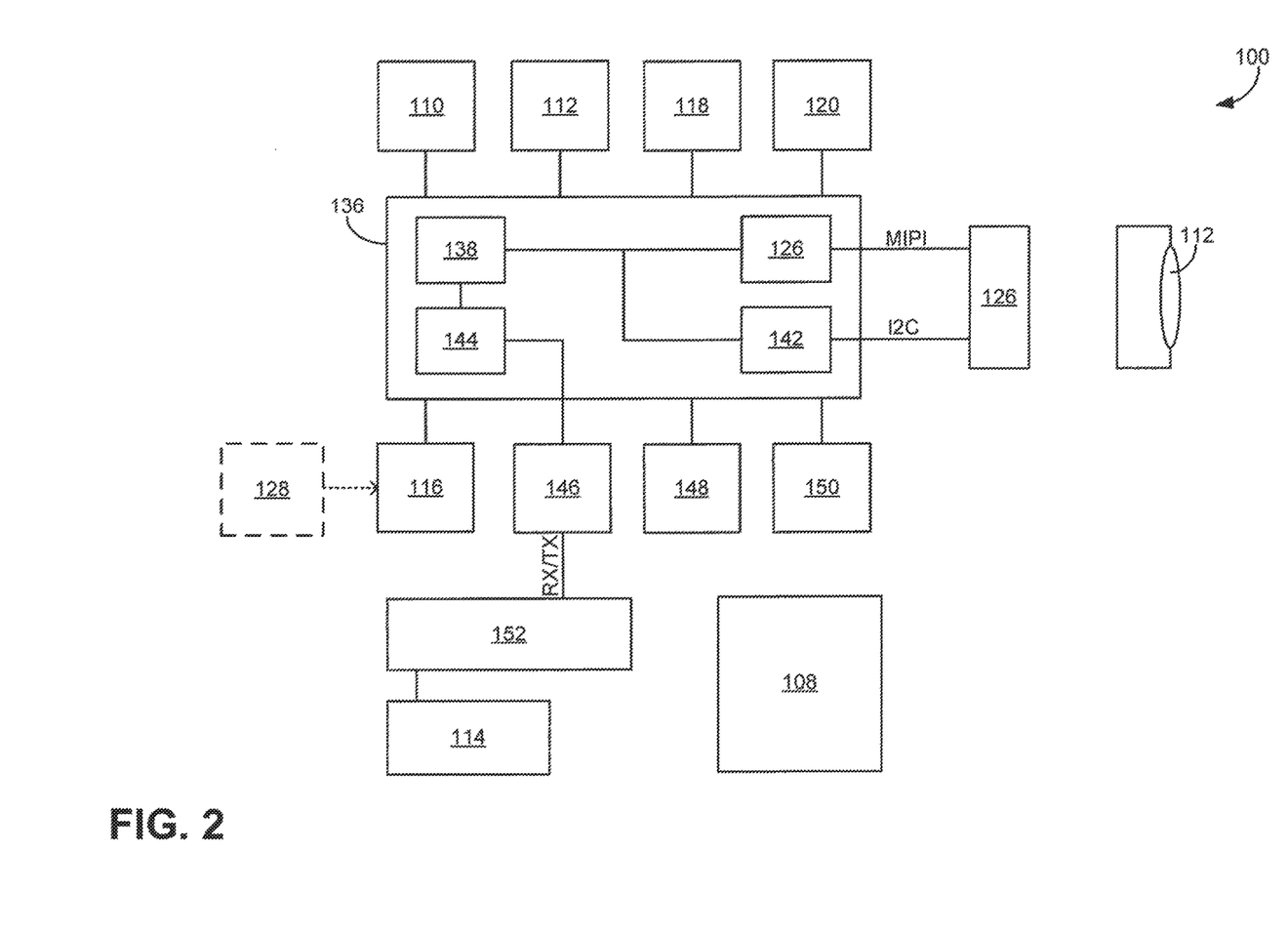
FIG. 2 is a block diagram of the security camera of FIG. 1.

While the camera 100 of FIG. 1 uses removable storage in the form of the memory card 128, in alternative embodiments (not depicted) the removable storage may be any suitable type of non-transitory and removable computer readable medium. For example, the removable storage may comprise any one or more of magnetic tapes, floppy disks, zip disks, optical discs, portable external hard drives and SSDs, and flash media such as USB flash drives. Removable storage may be directly connected to the camera 100, such as by inserting the memory card 128 into the memory card reader 116, it may be indirectly connected to the camera 100 such as by daisy chaining several USB hard drives together, or it may be indirectly connected to the camera 100 via a network such as the Internet or a local area network.

Furthermore, while FIG. 1 shows the camera 100 as being a box-body type of camera, in alternative embodiments (not depicted) the camera 100 may be a different type of camera such as a dome camera, bullet camera, pan-tilt-zoom (PTZ) camera, or multi-headed camera.

Referring now to FIG. 2, there is shown a block diagram of the security camera 100. A lens 112 is positioned to refract light on to the image sensor 126, which outputs a digital signal to a system on a chip 136 (SoC) in response to this incident light. The SoC 136 comprises a processor 138, an image signal processor (ISP) 126, a Media Access Controller (MAC) 144, and an I2C interface 142. The processor 138 is communicative with each of the ISP 126, MAC 144, and I2C interface 142. The ISP 126 is communicative with the image sensor 126 via the MIPI™ protocol and the I2C interface 142 is communicative with the image sensor 126 using the I2C protocol. The I2C interface 142 is used to control camera parameters such as gain, exposure, and frame rate.

The SoC 136 comprises part of the camera's 100 processing circuitry. The SoC 136 is communicative with a variety of different components that comprise the camera 100. The SoC 136, and more particularly the processor 138, is communicative with removable media circuitry in the form of the memory card reader 116. The SoC 136 is also communicative with a physical layer integrated circuit (PHY) 146 that is communicative with the MAC 144; flash memory 148, which is an example non-transitory computer readable medium that is non-volatile and that stores statements and instructions to cause the SoC 136 to perform tasks such as image processing; RAM 150, which is another example non-transitory computer readable medium, but which is volatile and which the SoC 136 uses to temporarily store information and for working space while performing tasks; the connection status and link LEDs 110,112; the audio/video connector 118 and the general purpose input/output ports 120.

While in the depicted embodiment the removable media circuitry comprises the memory card reader 116, in alternative embodiments (not depicted) the removable media circuitry may be any suitable type of circuitry that permits the SoC 136 to communicate with removable media. For example, the removable media circuitry may alternatively comprise a USB port and controller that permit the SoC 136 to communicate with an external and portable SSD or via other forms of removable media via eSATA, FireWire™, ThunderBolt™ or proprietary connections.

Also comprising part of the camera 100 are Ethernet magnetics 152, which are communicative with the RJ45 jack 114 and the PHY 146, and the power control block 108, which supplies power to the various electrical components comprising the camera 100. While in the depicted embodiment the power control block 108 accepts DC power as input, in alternative embodiments (not depicted) the camera 100 may be powered using, for example, an AC adapter, with batteries, or using PoE technology as mentioned above in respect of FIG. 1.

While FIG. 1 shows the camera 100 as being contained within a single housing that is the camera body 102, in alternative embodiments (not depicted) the camera 100 may be divided between multiple housings and collectively comprise several components that are communicative with each other. For example, the camera circuitry may be split across several printed circuit boards placed in different housings and connected via cables in order to miniaturize various camera components, as described in PCT patent application PCT/CA2013/050334.

Additionally, while FIGS. 1 and 2 show the lens 112 as comprising part of the camera 100, in alternative embodiments (not depicted) the camera 100 may be a lensless camera.

Figure 3:
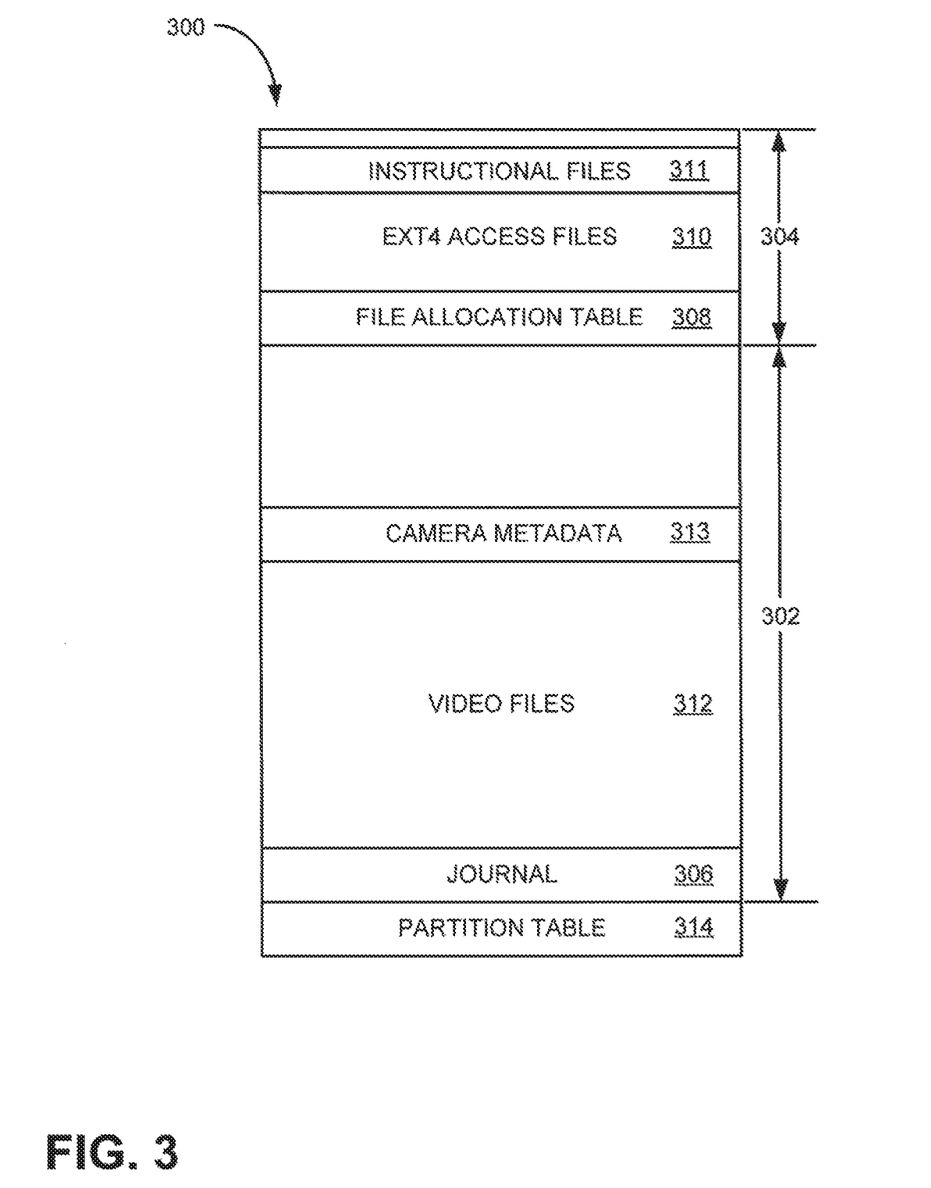
FIG. 3 is a memory map of the removable storage used in the security camera of FIG. 1.

Referring now to FIG. 3, there is shown a memory map 300 of the memory card 128 after it has been formatted into a journaled partition 302, which uses the ext4 file system, and a non journaled partition 304, which uses the FAT32 file system. At the beginning of the address space of the memory card 128 is a partition table 314 that describes, among other things, the location and nature of the journaled and non journaled partitions 302,304. The partition table 314 may be, for example, a master boot record or a GUID Partition Table. The journaled partition 302 comprises a journal 306, which ext4 uses to log changes made to files in the file system; camera metadata 313, which comprises information about the camera 100 such as its MAC, serial number, name, and location, which off-camera software applications can use when categorizing and processing data the camera 100 stores to the journaled partition 302; and storage space that the processor 138 can write data to and read data from. As shown in the memory map 300, a portion of this storage space is filled with video files 312, while the remainder of it is empty and available to the processor 138 as required.

The non-journaled partition 304 comprises a file allocation table 308, which is an index table identifying the clusters comprising the non-journaled partition 304; instructional files 311, which comprise files such as a readme file or help file to explain to users how to use the ext4 access files 310; and the ext4 access files 310, which comprise computer program code executable by a processor, such as the processor in a desktop computer, to use an operating system, such as the Windows™ and OS X™ operating systems, to access files stored on the journaled partition 302 (this processor is hereinafter the "client processor", and the operating system the client processor runs is hereinafter the "client OS"). In one embodiment this computer program code comprises Ext2Read, available from http://sourceforge.net/projects/ext2read/, but in alternative embodiments (not depicted) the program code may vary depending on, for example, the type of file system used in the journaled partition 302. While in the depicted embodiment this computer program code comprises multiple files, in alternative embodiments (not depicted) this computer program code may be only a single file.

As the memory map 300 shows, in the depicted embodiment all usable capacity of the memory card 128 is allocated entirely to the journaled and non-journaled partitions 302, 304. Furthermore, the non-journaled partition 304 has less capacity than the journaled partition 302, since the purpose of the non-journaled partition 304 is to store the ext4 access files 310 while the purpose of the journaled partition 304 is to store the video files 312, which are typically much larger.

When the memory card 128 is inserted into a memory card reader connected to the client processor, the client processor reads the partition table 314 using the client OS. Assuming the client OS is the Windows™ or OS X™ operating systems, the user will be able to natively access the non-journaled partition 304 but not the journaled partition 302. The user can consequently use the client processor to run the ext4 access files 310, which will give the user access to the journaled partition 302 and, consequently, to the video files 312. In an alternative embodiment (not depicted), the non-journaled partition 304 may also store in its root directory an autorun.inf file configured to cause the Windows™ operating system to automatically run the ext4 access files shortly after the client processor gains access to the memory card 128.

Figure 4A:
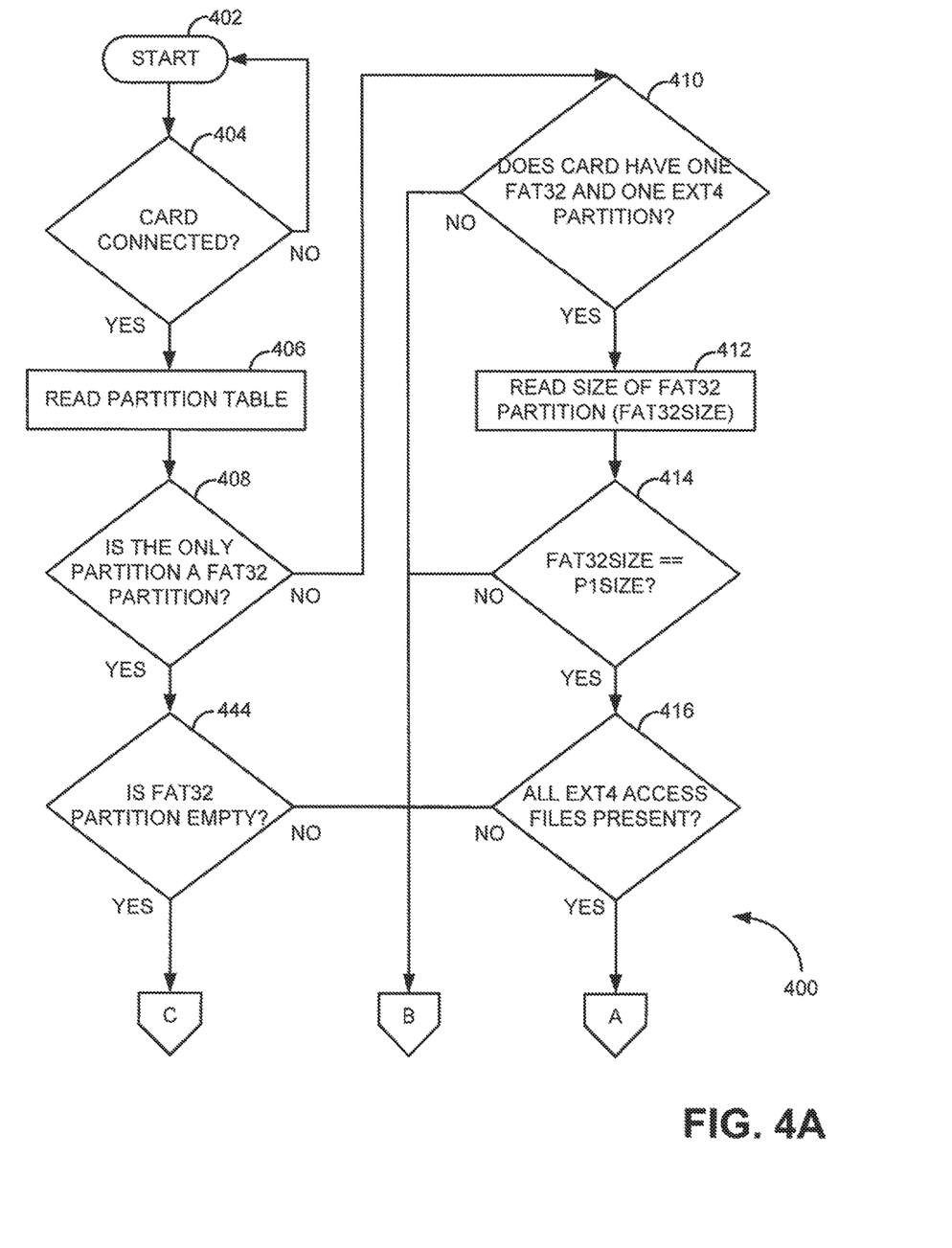
FIGS. 4A and 4B collectively depict a method for formatting the removable storage used in the security camera of FIG. 1, according to another embodiment.
Figure 4B:
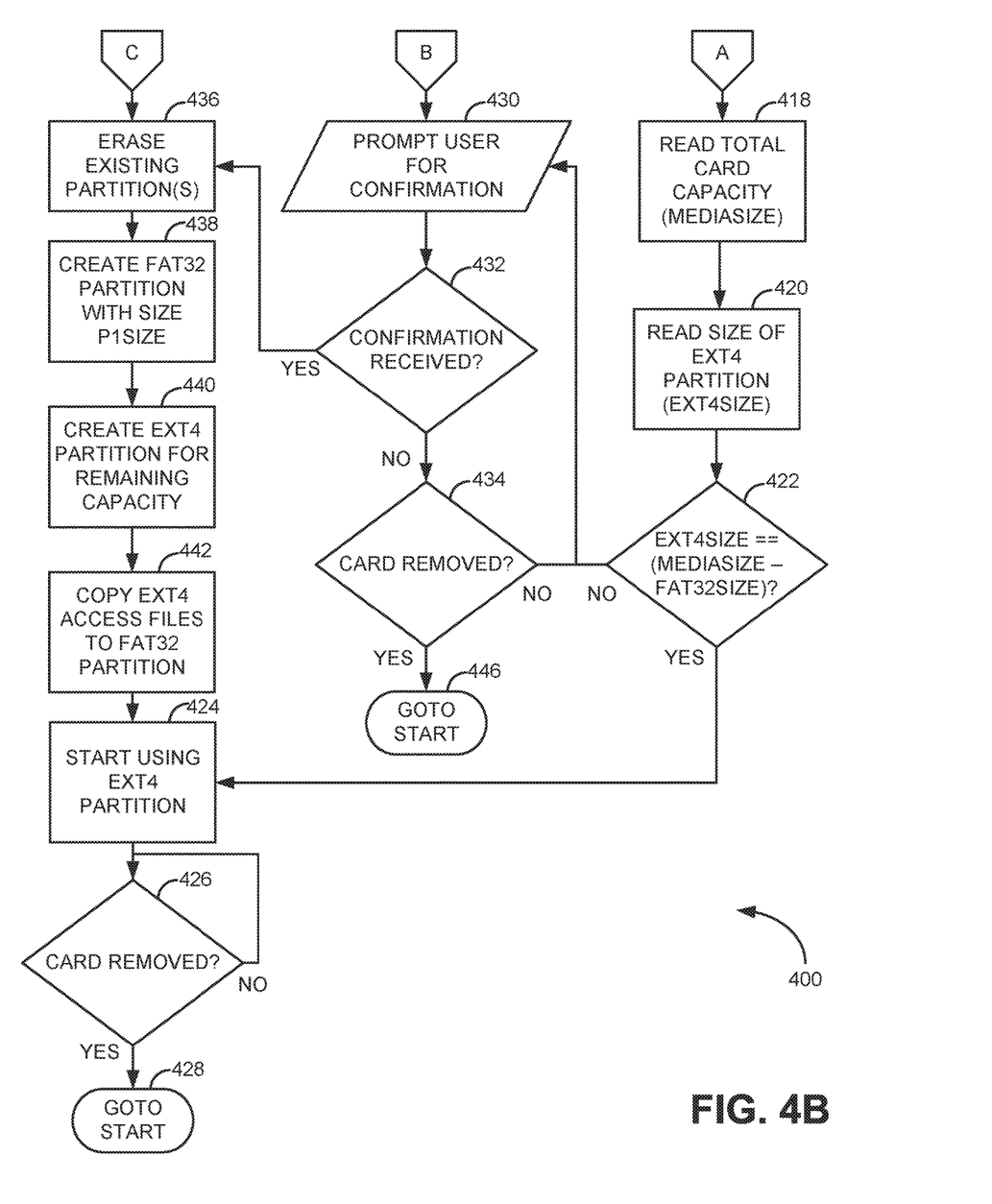

FIGS. 4A and 4B collectively show a method 400 for formatting the removable storage used in the security camera 100, according to another embodiment. In particular, the method 400 is directed at embodiments in which the removable storage comprises the memory card 128 and in which formatting of the memory card 128 is consequently done by the user as opposed to the camera's 100 manufacturer. While the depicted embodiment of the method 400 contemplates the use of FAT32 as the non-journaling file system and ext4 as the journaling file system, in alternative embodiments (not depicted) different journaling and non-journaling file systems may be used. For example, alternative journaling file systems include ext2, ext3, NTFS, JFS, and exFAT, while alternative non-journaling file systems include FAT16, FAT32, CDFS, and UDF. Similarly, while the method 400 is directed at removable storage in the form of the memory card 128, in alternative embodiments (not depicted) removable storage comprising other types of computer readable media may be used.

Various use cases embodied by the method 400 are described below.

No Formatting Required

In one example, the memory card 128 is already properly formatted into the journaled and non-journaled partitions 302,304, and upon determining this the processor 138 does not again format the memory card 128 (this example is the "no formatting example").

In this example, the processor 138 begins performing the method at block 402 and proceeds to block 404 where it determines whether the memory card 128 is connected to the camera 100 by entering a loop waiting for the user to connect the memory card 128 to the removable media circuitry. When the user connects the memory card 128 to the removable media circuitry, the processor 138 proceeds to block 406 where it reads the partition table 314 on the memory card 128. Assuming the memory card 128 has already been formatted and comprises at least one partition ("first initial partition"), the processor 138 then determines at block 408 whether the first initial partition comprises the only partition on the memory card 128 and uses FAT32. If no, then the processor 138 proceeds to block 410 where it determines whether the memory card 128 includes another partition ("second initial partition"), whether the first and second initial partitions comprise the only partitions on the memory card 128, and whether the first and second initial partitions are FAT32 and ext4 partitions, respectively. If yes, then depending on the sizes of these partitions it may be that the memory card 128 has already been properly formatted and is ready for use. The initial partition that uses FAT32 is hereinafter the "FAT32 partition" and the other initial partition that uses ext4 is hereinafter the "ext4 partition". As mentioned above, however, in alternative embodiments (not depicted) a different journaling file system, a different non-journaling file system, or both, may be used.

The processor 138 accordingly proceeds to block 412 where it reads the size of the FAT32 partition, which is hereinafter "FAT32SIZE". Once the processor 138 has FAT32SIZE, the processor 138 proceeds to block 414 where it determines whether FAT32SIZE equals P1SIZE, which is the name of a constant that represents a fixed non-journaled partition size. If FAT32SIZE equals P1SIZE, the non-journaled partition 304 then proceeds to block 416 where it determines whether all the ext4 access files 310 are already on the FAT32 partition. If all the ext4 access files 310 are present, the processor 138 reads the total capacity of the memory card 128 at block 418, reads the size of the ext4 partition at block 420, which is hereinafter "EXT4SIZE", and determines at block 422 whether all usable capacity of the memory card 128 is allocated entirely to the FAT32 and EXT4 partitions. If yes, then the processor 138 concludes that the memory card 128 has been properly formatted into the journaled and non-journaled partitions 302,304, treats the ext4 partition as the journaled partition 302, and consequently begins writing data to the ext4 partition as block 424. The processor 138 remains in this state at block 426 until the memory card 128 is removed, following which the processor 138 returns to the start 402 of the method 400.

Automatic Formatting Performed

In another example, the processor 138 determines that the memory card 128 has not been properly formatted into the journaled and non-journaled partitions 302,304, and automatically reformats the memory card 128 (this example is the "automatic formatting example").

In this example, the processor 138 begins performing the method 400 as in the no formatting example until the processor 138 determines whether the FAT32 partition is the only partition on the memory card 128 at block 408. Unlike in the no formatting example, in the automatic formatting example the FAT32 partition is the only partition on the memory card 128 and the processor 138 proceeds to block 444 where it determines whether the FAT32 partition is empty. If yes, the processor 138 determines it can safely reformat the memory card 128 without erasing any data the user may want to protect and proceeds to block 436 where it erases the FAT32 partition. Once the FAT32 partition has been erased, the processor 138 proceeds to block 438 where it creates a new FAT32 partition of size P1SIZE, which is the non-journaled partition 304. The processor 138 then proceeds to block 440 where it creates a new ext4 partition encompassing the remaining usable capacity of the memory card 128; this new partition is the journaled partition 302. After creating the journaled partition 302 the processor 138 proceeds to block 442 where it copies the ext4 access files 310 to the non-journaled partition 304, and the processor 138 then begins writing data such as the video files 312 to the journaled partition 302 at block 424. As in the no formatting example, the processor 138 remains in this state at block 426 until the memory card 128 is removed, following which the processor 138 returns to the start 402 of the method 400.

User Confirmation Obtained Prior to Formatting

In another example, the processor 138 determines that the memory card 128 has not been properly formatted into the journaled and non-journaled partitions 302,304, but does not automatically format the memory card 128 because there is a chance that by doing so data on the memory card 128 may be inadvertently erased (this example is the "user confirmation example"). In this user confirmation example, the processor 138 seeks user confirmation prior to formatting the memory card 128 into the journaled and non-journaled partitions 302,304.

In the user confirmation example, the processor 138 waits for any one of several triggering events before prompting the user to confirm he or she wishes to reformat the memory card 128. In the embodiment of FIG. 4, these events comprise the processor 138 determining any one or more of the following:
 (i) the memory card 128 comprises only a single, FAT32 partition, but this partition is not empty (block 444);
 (ii) the memory card 128 does not comprise only a single, FAT32 partition, nor does it comprise only one FAT32 partition and one ext4 partition (block 410); and
 (iii) the memory card 128 comprises only one FAT32 partition and one ext4 partition, but:
  (1) FAT32SIZE does not equal P1SIZE (block 414);
  (2) the ext4 access files 310 are not present on the FAT32 partition (block 416); or
  (3) all usable capacity of the memory card 128 is not allocated entirely to the FAT32 and ext4 partitions (block 422).

If any one or more of the above listed conditions occurs, the processor 138 proceeds to block 430 where it prompts the user for confirmation that the memory card 128 is to be reformatted and checks to see if the user has provided this confirmation at block 432. Until the processor 138 receives this confirmation or until the memory card 128 is removed, the processor 138 loops between blocks 432 and 434 while waiting for user confirmation or for the user to remove the memory card 128. If the user removes the memory card 128 (block 434), the processor 138 proceeds to block 446 and returns to the beginning of the method 400. If the user provides confirmation that the memory card 128 is to be reformatted (block 432), the processor 138 proceeds to block 436 and proceeds as it does in the automatic formatting example. That is, the processor 138 erases all partitions on the memory card 128 (block 436), creates the journaled and non-journaled partitions 302,304 (blocks 438 and 440), copies the ext4 access files 310 to the non-journaled partition 304 (block 442), and starts and continues using the journaled partition 302 (block 424) until the user removes the memory card 128 (block 426) in which case the processor 138 returns to the beginning of the method (block 428).

In the method 400 of FIGS. 4A and 4B, the processor 138 does not write data to or erase data from the non-journaled partition 304 after having created it and copied the ext4 access files 310 to it. In alternative embodiments, however, the processor 138 may subsequently modify the non-journaled partition 304 even after having completed formatting the memory card 128 by performing the method 400.

Additionally, in the method 400 of FIGS. 4A and 4B the processor 138 ensures that the memory card 128 is formatted to comprise the journaled and non-journaled partitions 302, 304, and that these partitions 302,304 collectively utilize all the memory card's 128 usable capacity. In alternative embodiments (not depicted), the processor 138 may permit usage of a differently formatted memory card 128. For example, the processor 138 may permit usage of a memory card 128 having three or more partitions so long as two of those partitions are the journaled and non-journaled partitions 302,304, even though the journaled and non-journaled partitions 302,304 do not collectively utilize all the memory card's 128 usable capacity. Alternatively or additionally, the processor 138 may not require FAT32SIZE to equal P1SIZE, and instead may allow the memory card 128 to be used so long as the FAT32 partition is large enough to store the ext4 access files 310. Alternatively or additionally, if the ext4 access files 310 are not present on the FAT32 partition, instead of reformatting the entire memory card 128 the processor 138 may simply copy the ext4 access files 310 to the FAT32 partition and, presuming the FAT32 partition is large enough to store those files 310 and the memory card 128 also comprises the ext4 partition, begin storing files on the ext4 partition.

In another alternative embodiment (not depicted), the processor 138 may automatically reformat the memory card 128 without waiting for user confirmation if the memory card 128 is not partitioned into the journaled and non-journaled partitions 302,304 that collectively utilize all the memory card's 128 usable capacity.

As an example of another alternative embodiment that is not depicted, the processor 138 may automatically partition the memory card 128 when it detects that the memory card 128 has been connected to the memory card reader 116. This embodiment can be used, for example, when each time the memory card 128 is removed its entire contents is presumed to be transferred to a desktop computer or server.

In the depicted embodiments, the removable storage is partitioned via formatting. In alternative embodiments (not depicted), partitioning may be done without formatting.

While the SoC 136 is used in the foregoing embodiments, in alternative embodiments (not depicted) the SoC 136 may instead be, for example, a microprocessor, processor, microcontroller, controller, programmable logic controller, field programmable gate array, or an application-specific integrated circuit. Examples of computer readable media are non-transitory and include disc-based media such as CD-ROMs and DVDs, magnetic media such as hard drives and other forms of magnetic disk storage, and semiconductor based media such as flash media, SSDs, random access memory, and read only memory.

It is contemplated that any part of any aspect or embodiment discussed in this specification can be implemented or combined with any part of any other aspect or embodiment discussed in this specification.

For the sake of convenience, the example embodiments above are described as various interconnected functional blocks. This is not necessary, however, and there may be cases where these functional blocks are equivalently aggregated into a single logic device, program or operation with unclear boundaries. In any event, the functional blocks can be implemented by themselves, or in combination with other pieces of hardware or software.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. An apparatus comprising:
   (a) an image sensor that, in operation of the apparatus, facilitates generation of at least one video file from light received at the image sensor;
   (b) removable media circuitry configured to write to removable storage; and
   (c) processing circuitry, communicatively coupled to the image sensor and the removable media circuitry, configured to perform a method comprising:
      determining whether the removable storage is properly formatted;
      when the removable storage is determined to be not properly formatted, causing user input to be sought in confirming whether to proceed with partitioning the removable storage to comprise a journaled partition that uses a journaling file system and a non-journaled partition that uses a non-journaling file system supported natively by an operating system;
      when confirmed by the user input, proceeding with the partitioning of the removable storage to comprise the journaled partition and the non journaled partition;
      following the partitioning of the removable storage to comprise the journaled partition and the non-journaled partition, storing the at least one video file on the journaled partition; and
      storing, on the non-journaled partition and using the non-journaling file system, processor-executable computer program code, and
      wherein the operating system is permitted to access, once the computer program code has been executed, the at least one video file stored on the journaled partition.

2. The apparatus of claim 1 wherein all usable capacity of the removable storage is allocated entirely to the journaled and non-journaled partitions.

3. The apparatus of claim 1 wherein the processing circuitry is further configured not to write or erase data from the non-journaled partition following storing of the computer program code thereon.

4. The apparatus of claim 1 wherein the journaled partition has a larger capacity than the non-journaled partition.

5. The apparatus of claim 1 further comprising a camera housing containing the image sensor, the removable media circuitry and the processing circuitry.

6. The apparatus of claim 1 wherein the removable storage is a single memory card, a single external hard drive or a single solid state drive.

7. An apparatus comprising:
(a) an image sensor that, in operation of the apparatus, facilitates generation of at least one video file from light received at the image sensor;
(b) removable media circuitry configured to write to removable storage; and
(c) processing circuitry, communicatively coupled to the image sensor and the removable media circuitry, configured to perform a method comprising:
based on a determination that the removable storage is not properly formatted, seeking user input in confirming whether to proceed with partitioning the removable storage to comprise a journaled partition that uses a journaling file system and a non-journaled partition that uses a non-journaling file system supported natively by an operating system not stored on the removable storage;
when confirmed by the user input, proceeding with the partitioning of the removable storage to comprise the journaled partition and the non journaled partition;
following the partitioning of the removable storage to comprise the journaled partition and the non-journaled partition, storing the at least one video file on the journaled partition; and
storing, on the non-journaled partition and using the non-journaling file system, processor-executable computer program code, and
wherein the operating system is permitted to access, once the computer program code has been executed, the at least one video file stored on the journaled partition.

8. The apparatus of claim 7 wherein all usable capacity of the removable storage is allocated entirely to the journaled and non-journaled partitions.

9. The apparatus of claim 7 wherein the processing circuitry is further configured not to write or erase data from the non-journaled partition following storing of the computer program code thereon.

10. The apparatus of claim 7 wherein the journaled partition has a larger capacity than the non-journaled partition.

11. The apparatus of claim 7 further comprising a camera housing containing the image sensor, the removable media circuitry and the processing circuitry.

12. The apparatus of claim 7 wherein the removable storage is a single memory card, a single external hard drive or a single solid state drive.

* * * * *